Aug. 23, 1927.
B. L. OLOFSSON ET AL
1,640,247
VALVE
Filed March 5, 1926
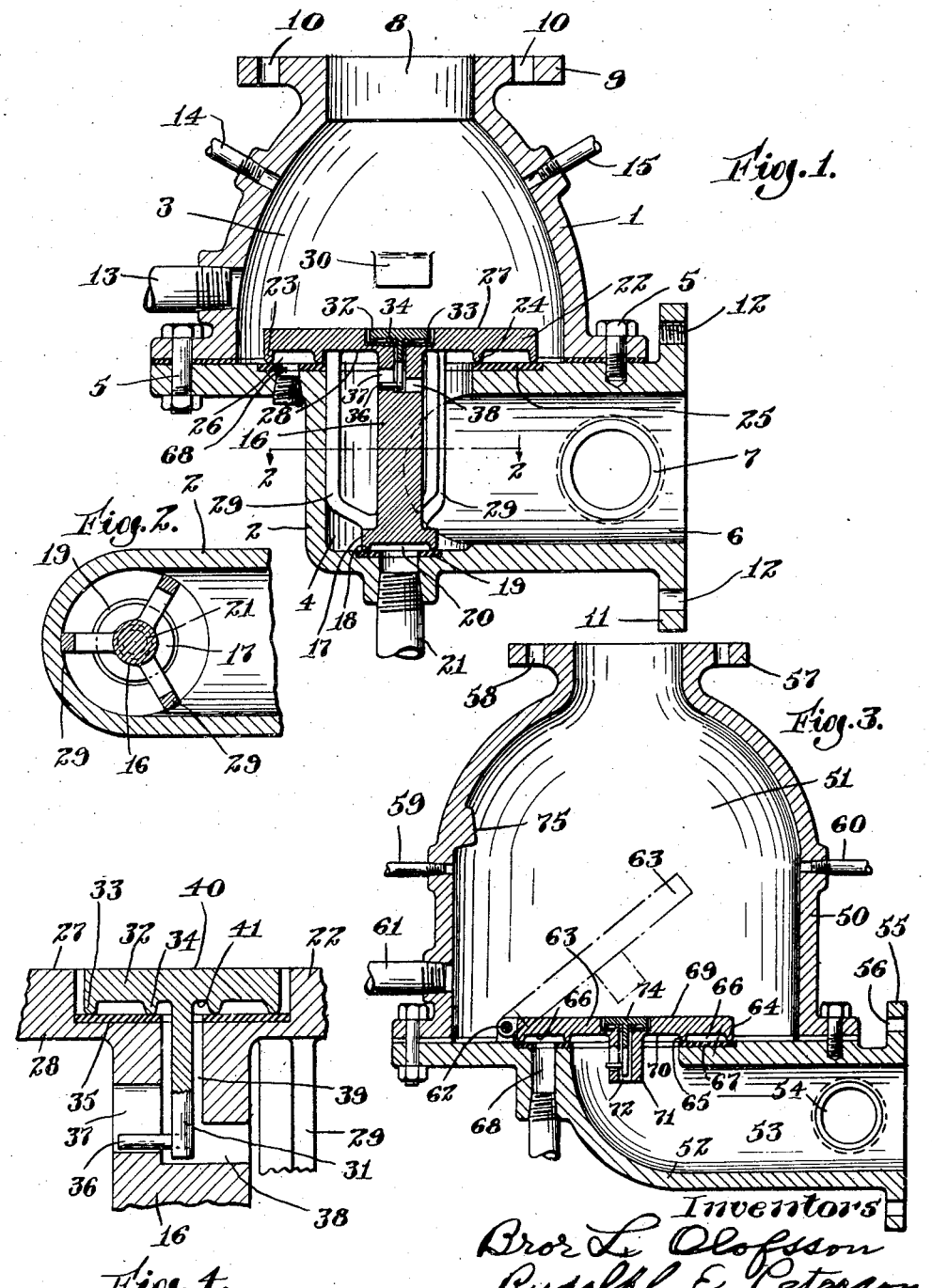
Inventors
Bror L. Olofsson
Rudolph E. Peterson
by James R. Hodder
Attorney Patented Aug. 23, 1927.

1,640,247

UNITED STATES PATENT OFFICE.

BROR L. OLOFSSON AND RUDOLPH E. PETERSON, OF DORCHESTER, MASSACHUSETTS.

VALVE.

Application filed March 5, 1926. Serial No. 92,413.

Our present invention relates primarily to valves, and more particularly to valves adapted for utilization in automatic sprinkler systems.

The automatic sprinkler systems now in general use, are of two types, viz., dry pipe systems and wet pipe systems. The dry pipe systems are never considered as efficient as wet systems, as they are much slower in action, since most of the air must escape before water reaches the opened sprinklers. These sprinklers, as is well known, generally depend upon the fusion of a soldered link to release the water and upon a deflector for the proper distribution of the water. The dry pipe system, however, is necessary where it is not practicable to keep the temperature above the freezing point, as otherwise the water in the system would freeze and render the same useless. In order to utilize the same system for both dry and wet use, the installation must necessarily be expensive, complicated and more or less difficult of operation. This is due to the fact that up to the present time, no valve has been devised which would operate satisfactorily in both a wet and a dry system.

A principal object of our invention, therefore, is the provision of such a valve, automatically interchangeable with air or water, and operable with equal efficiency regardless of whether the system is wet or dry.

A further difficulty has been that no dry pipe valve, of which we are aware, has been devised which will function to operate an alarm when the system is "wet", and vice versa.

A further important and novel feature of our present invention, therefore, is to provide a valve which is capable of use interchangeably with air or water, and which will function to sound an alarm when the system operates in both instances.

A further feature of our device is the provision of novel equalizing means to insure firm seating of the valve under all conditions.

We believe that our novel valve, interchangeable as it is with air or water, is novel and we wish to claim the same broadly herein.

We also believe that such a valve constructed and arranged to sound an alarm, in either a wet or dry system, upon operation of the system, is novel, and we also wish to claim this feature herein.

Further features of the invention, combinations of parts, details and advantages, will be hereinafter more fully pointed out and claimed.

Referring to the drawings, illustrating a preferred embodiment of our present invention, Fig. 1 is a medial cross-section of the completed valve;

Fig. 2 is a cross-sectional view on the line 2—2 of Fig. 1;

Fig. 3 is a medial cross-sectional view of a modification; and

Fig. 4 is a detail, in enlarged form, of the equalizing means.

As shown in the drawings, our novel interchangeable valve comprises a valve body having casings 1 and 2, the casing 1 enclosing a chamber 3 and the casing 2 enclosing a chamber 4. The casings 1 and 2 may be secured together by bolts 5 or may be cast as a single casing, if desired. An inlet 6 is provided into the casing 2 and connecting with the chamber 4, which in turn connects directly with the chamber 3. A drain pipe 7 is illustrated from the water inlet 6.

The chamber 3 has an orifice or opening 8 which connects with the automatic sprinkler system for permitting the passage of water thereto, and also has a flange 9, with suitable bolt holes 10, 10, for securing to the piping of the system. The casing 2 has a similar flange 11 and bolt holes 12, 12, for connection to the water system.

Leading from the chamber 3 is a drain pipe or plug 13, and a pipe or line 14 which runs to a pressure air gauge or other desired instrument. A line 15 connects with the chamber 3 for pumping air under any desired pressure thereto.

To provide for proper functioning of the valve, utilizing a dry pipe system, for example, we have devised a novel valve comprising a valve stem 16 having a small head 17 with an annular flange 18 which rests upon a valve seat 19 of rubber, leather, Babbitt metal or the like. This construction provides a water-tight chamber 20 leading to a pipe or line 21 which is utilized to sound an electrical alarm upon the passage of water therethrough, or may be connected to a water motor to sound a continuous mechanical alarm.

On the upper end of the valve stem 16 is a large head 22 having an outer annular flange 23, and an inner annular flange 24, which flanges rest upon a valve seat 25 similar to the seat 19 and for the same purpose. These flanges, when on the seat 25, form a watertight chamber 26. This larger valve head 22 is constructed and designed for a differential of approximately three to one, viz., the surface 27 having approximately three times the area of the surface 28 contained within the inner annular flange 24. Thus when the chamber 3 has an air pressure of say twenty pounds therein, this will keep the valve closed under a water pressure of sixty pounds from the inlet 6. Guide rods 29 are affixed to the valve and contact with the walls of the chamber 4 to insure even rising and falling of the valve. A stop 30 is provided in the chamber 3 to limit the upward movement of the valve, or a plurality of these stops may be provided if desired.

The operation of our novel valve when used in a dry pipe system, will be readily understood. There being a water pressure of, for example, sixty pounds in the inlet 6 and chamber 4, and an air pressure of twenty pounds in the chamber 3, the valve 16 is maintained closed because of the differentials in the surfaces 27 and 28. Upon fusion of one or more of the soldered links in the sprinkler system, the air under pressure in the chamber 3 will exhaust, thus permitting the water to raise the valve 16 and escape through the chamber 3 into the system and through the sprinklers. Simultaneously with the raising of the valve 16, the annular flange 18 is raised from the seat 19 and permits the entry of water into the chamber 20 and through the pipe 21 to sound an alarm, either electrical or mechanical, as above described. This alarm may be shut off by hand or will be stopped by the return of the valve 16 to normal position. When the fire has been extinguished and it is desired to return the valve to normal position, the water line leading to the inlet 6 is closed, the water drained through the outlets 7 and 13 and the valve 16 will return to normal position. Thereupon air pressure may be applied in the chamber 3, the water admitted to the inlet 6 and chamber 4, and the valve is again ready for operation. It will thus be seen that our novel valve is extremely simple of operation and efficient in its action. An inspection and access plate (not shown) is provided on one side of our novel interchangeable valve, but as these plates are well-known and customary, the same is not shown.

As above explained, our novel valve is adapted to be used interchangeably with either air or water systems, or "wet" and "dry" systems, and to make this possible, we have devised a novel equalizing means to equate the pressure of the water in the chamber 3 and the chamber 4. In other words, the automatic sprinkler system, utilizing our novel valve, may be changed from a dry system to a wet system without chambers or alterations of any kind. This novel equalizing means comprises an auxiliary valve, constructed and arranged substantially the same as the larger water controlling valve.

Fig. 4 illustrates this equalizing device, on an enlarged scale, wherein the valve stem 31 has a head 32, outer annular flange 33 and inner annular flange 34, fitting on a valve seat 35, preferably of the same material as the valve seats 19 and 25. On the lower end of the stem 31 is a pin 36 sliding in a slot 37 to limit the upward movement of the valve. An aperture 38 is provided for the admission of water to the small chamber 39. It will be noted that we have provided surfaces of varying differentials in this auxiliary valve, the surface 40 having a much greater area than the surface 41. Thus, when the dry pipe system is in operation, the air pressure on the surface 40 will offset the water pressure on the surface 41, due to the differential in the surfaces affected. When, however, it is desired to change from a dry pipe system to a wet pipe system, as in the summer time when there is no danger of freezing, the air is exhausted from the system above the valve, and the water automatically flows in, raising the entire valve 16 and component parts, whereupon the auxiliary or equalizing valve head 32 will also be raised, and the main water control valve will drop of its own weight until resting on the seats 19 and 25. Thereupon, when the pressure in the chamber 3 and chamber 4 is equal, the auxiliary valve 32 will also seek its normal position, and rest on its seat 35, but with any change of pressure from the chamber 4, this auxiliary valve will automatically take care of same, keeping the main water control valve closed. The operation of the valve in a wet pipe system, in event of fire and fusion of the soldered links in the sprinklers, will be exactly the same as in a dry pipe system, as above described.

In Fig. 3 we have illustrated a modification of the device shown in Figs. 1, 2 and 4, wherein the casing 50 encloses a chamber 51, in which may be either air under pressure, or water. The casing 52 encloses an inlet 53 having a drain 54, and has a flange 55 and bolt holes 56 for securing to the water system. Casing 50 has a flange 57 and bolt holes 58 for connection to the upper part of the system. A gauge lead 59 and air pressure line 60 are also illustrated, together with a drain 61. Pivoted at 62 is a clapper 63 having an outer annular flange 64 and inner annular flange 65 forming a chamber 66 when resting on the valve seat 67. This chamber 66 connects with an outlet 68 leading to either an electrical alarm, or a water motor, to sound a mechanical alarm. The clapper 63 also has surfaces of varying differentials, the surface 69 being of greater area than the surface 70, so that when used in a dry pipe system, a low pressure of air will hold the clapper 63 closed against a substantially greater pressure of water on the surface 70. The clapper 63 also has a depending stem 71 having a water inlet 73 and has an equalizing valve 74 similar to the one described in Figs. 1 and 4. When used with air in the chamber 51, the pressure of the air keeps the clapper 63 closed, as well as the auxiliary valve 74, because of the varying differentials in the surfaces thereof, but upon fushion of one or more of the soldered links in the sprinkler system, the air will exhaust, and the pressure of the water will raise the clapper to permit the passage of water thereby to the sprinkler system, and simultaneously the water will enter the chamber 66 and thence through the outlet 68 to an alarm. Upon extinguishment of the fire, the water below the inlet 53 is shut off, the clapper 63 will return to normal position, chamber 51 filled with air under desired pressure, water turned into the inlet 53, and the device is again ready for operation.

This particular modification is also equally adaptable for service when the sprinkler system is "wet" throughout, and will operate substantially as described for the device in Fig. 1, the automatic equalizer keeping the clapper 63 on its seat 67. Upon being operated by the fushion of the links in the sprinkler system, the clapper 63 will rise in the same manner as if controlled by air in the chamber 51, whereupon the water will pass by the clapper 63, and out to the sprinkler system, simultaneously entering the chamber 66, through the outlet 68 and to the alarm.

A stop 75 is provided for the clapper 63 should it be forced open to this limit by the water pressure.

It will thus be seen that we have devised a further novel valve, interchangeable with equal efficiency with dry pipe or wet pipe systems, and one which will operate to sound an alarm when in either system, and believing this modification to be also new and useful, we desire to claim the same broadly herein.

While we have necessarily described our invention somewhat in detail, it will be appreciated that we are not limited thereto, but may vary the size, shape and arrangement of parts within reasonably wide limits without departing from the spirit of the invention.

It will also be appreciated that the auxiliary valve or equalizing means will take care of any excess pressure or "water hammers", and in that way will prevent false alarms.

If desired, also, we may utilize the alarm outlet 68 in the construction illustrated in Fig. 1, connecting with the chamber 26. In this way we will have two alarm outlets in the construction of Fig. 1, viz. 21 and 68, one of which may be utilized to operate an electrical alarm and the other to operate a mechanical water motor.

Our invention is further described and defined in the form of claims as follows:

1. Water supply controlling mechanism for use in automatic sprinkler systems, comprising a casing defining a chamber having a water inlet and a water outlet, a valve normally seated in said chamber and closing said inlet, and adapted to be opened upon decreased pressure in said chamber, the chamber surface of the valve having a substantially greater area than the surface exposed to the inlet, a stem depending from said valve, a recess in said valve stem, means functioning upon operation of said valve to permit the sounding of an alarm, means to limit movement of said valve, an auxiliary valve seated approximately centrally in said main valve and in alinement with said valve stem and exposed to said recess, said recess extending from the water inlet to said chamber, the chamber surfaces of said two valves being substantially flush, the chamber surface of the auxiliary valve having a substantially greater area than the surface exposed to the recess in said valve stem, means to limit movement of said auxiliary valve, said last named means comprising a stem depending from said auxiliary valve into the recess in the main valve stem, a pin on said auxiliary valve stem, and a slot in the main valve stem in which said pin may slide, the height of said slot determining the limit of movement of said auxiliary valve.

2. Water supply controlling mechanism for use in automatic sprinkler systems, comprising a casing defining a chamber having a water inlet and a water outlet, a valve normally seated in said chamber and closing said inlet, and adapted to be opened upon decreased pressure in said chamber, the chamber surface of the valve having a substantially greater area than the surface exposed to the inlet, a stem depending from said valve, a recess in said valve stem extending from the water inlet to said chamber, a pair of annular ribs on the under surface of said main valve forming a watertight chamber leading to an alarm, means to limit movement of said valve, an auxiliary valve seated approximately centrally in said main valve and in alinement with said valve stem and exposed to said recess, the chamber surfaces of said two valves being substantially flush, the chamber surface of the auxiliary valve having a substantially greater area than the surface exposed to the recess in said valve stem, means to limit movement of said auxiliary valve, said last named means comprising a stem depending from said auxiliary valve into the recess in the main valve stem, a pin on said auxiliary valve stem, a slot in the main valve stem in which said pin may slide, the height of said slot determining the limit of movement of said auxiliary valve, and a third valve at the lower end of said main valve stem, an annular rib on the under surface of said third valve forming, when seated, a water-tight chamber leading to a second alarm, both said water-tight chambers functioning simultaneously to permit the sounding of said alarms, and guide rods on said valves bearing against the walls of the water inlet, to insure vertical movement of said valves.

In testimony whereof, we have signed our names to this specification.

BROR L. OLOFSSON.
RUDOLPH E. PETERSON.